3,328,424
1 - ISOPROPYLAMINO - 2 - HYDROXY - 3 - (2'-ISO-
PROPOXY - PHENOXY) - PROPANE AND SALTS
THEREOF
Karl Schenker, Binningen, Hans Ulrich Daeniker, Reinach, Basel-Land, Paul Schmidt, Therwil, Basel-Land, and Max Wilhelm, Allschwil, Switzerland, assignors to Ciba Corporation, New York, N.Y., a corporation of Delaware
No Drawing. Filed Sept. 24, 1965, Ser. No. 490,091
Claims priority, application Switzerland, Oct. 14, 1964, 13,361/64
2 Claims. (Cl. 260—326.14)

The present invention relates to a new secondary amine and its salts. Especially it concerns the 1-isopropyl-amino-2-hydroxy-3-(2'-isopropoxy-phenoxy)-propane of the formula

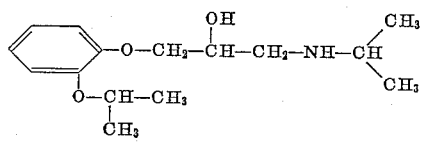

The new compound possesses valuable pharmacological properties, especially an inhibiting effect upon adrenergic β-receptors. For example, in the cat narcotized with dial or in the unnarcotized dog the compound inhibits the lowering of the blood pressure produced by isoproterenol when administered in doses of 0.01–1 mg./kg. i.v. or 2–3 mg./kg. p.o. It is capable of suppressing digitalis-induced extrasystoles as shown, for example, in experiments with a dosis of 0.3–1 mg./kg. i.v. in the narcotized dog. The compound can therefore be used as medicament for the treatment of cardiac and circulatory diseases.

The new compound is prepared by known methods. Advantageously, a 1-halogeno-2-hydroxy-3-(2'-isopropoxy-phenoxy)-propane or 3-(2'-isopropoxy-phenoxy)-1-2-epoxypropane is reacted with isopropylamine.

Halogen atoms are above all chlorine, bromine or iodine atoms.

The reaction is performed in the usual manner, advantageously in the presence of a basic condensing agent or of an excess of amine.

The starting materials are known or can be prepared by known methods.

Depending on the reaction conditions and starting materials used the final product is obtained in the free form or in the form of its salts which are likewise included in the present invention. The salts of the final product can be converted into the free base in known manner, for example with alkalies or ion exchange resins. When the base is reacted with organic or inorganic acids, especially those which are suitable for forming therapeutically useful salts, it yields salts. As such acids there may be mentioned for example:

Hydrohalic, sulfuric, phosphoric acids, nitric, perchloric acid; aliphatic, alicyclic, aromatic or heterocyclic carboxylic or sulfonic acids such as formic, acetic, propionic, succinic, glycollic, lactic, malic, tartaric, citric, ascorbic, maleic, hydroxymaleic or pyruvic acid; phenylacetic, zenzoic, para-aminobenzoic, anthranilic, parahydroxybenzoic, salicyclic or para-aminosalicyclic acid, embonic, methanesulfonic, ethanesulfonic, hydroxyethanesulfonic, ethylene-sulfonic acid; halobenzenesulfonic, toluenesulfonic, naphthalenesulfonic acid or sulfanilic acid; methionine, tryptophan, lysine or arginine.

These and other salts of the new compound, for example the picrate, may also be used for purifying the resulting free base, by converting the free base into a salt, separating it and liberating the base from the salt. In view of the close relationship of the new compound in the free form and in the form of its salts what has been said above and below with regard to the free base relates similarly and where suitable also to the corresponding salts.

The invention includes also any variant of the present process in which an intermediate obtained at any stage of the process is used as a starting material and any remaining step/steps is/are carried out or the process is discontinued at any stage thereof, or in which the starting materials are formed under the reaction conditions or may be used in the form of their salts.

The new compound may be in the form of the racemate or in the form of antipodes. The racemate can be resolved into its antipodes in the known manner.

The new compound may be used, for example, in the form of pharmaceutical preparations which contain it in the free form or in the form of its salts in conjunction or admixture with an organic or inorganic, solid or liquid pharmaceutical excipient suitable for enteral or parenteral administration. Suitable excipients are substances that do not react with the new compound, for example, water, gelatin, lactose, starches, stearyl alcohol, magnesium stearate, talcum, vegetable oils, benzyl alcohols, gums, polyalkyleneglycols, white petroleum jelly, or other known medicinal excipients. The pharmaceutical preparations may be, for example, tablets, dragees or capsules, or in liquid form solutions, suspensions or emulsions. They may be sterilized and/or contain auxiliaries such as preserving, stabilizing, wetting or emulsifying agents, solution promoters or salts for regulating the osmotic pressure or buffers. They may also contain further therapeutically valuable substances. The pharmaceutical preparations are formulated by known methods.

The following examples illustrate the invention.

*Example 1*

A mixture of 15 g. (0.072 mol) of 3-(2'-isopropoxy-phenoxy)-1,2-epoxypropane, 30 cc. of isopropylamine and 30 cc. of isopropanol is refluxed for 12 hours. The clear solution is evaporated under a water-jet vacuum and the residue mixed with a solution of 10 cc. of methanesulphonic acid in 200 cc. of water. The neutral products are removed by extraction with 100 cc. of benzene. The aqueous phase is decolorized with a little active carbon, filtered and the filtrate is rendered alkaline with concentrated sodium hydroxide solution. Extraction with mehylene chloride furnishes 1-isopropylamino-2-hydroxy-3-(2'-isopropoxy-phenoxy)-propane of the formula

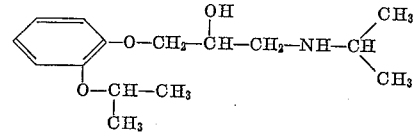

as a colourless oil which slowly crystallizes. After recrystallization from ethyl acetate+petroleum ether the base forms colourless needles melting at 60° to 61° C.

The hydrochloride is obtained by neutralizing an acetonic solution of the base with hydrogen chloride; it melts at 129° to 130° C.

The starting material is manufactured thus:

A solution of 76 g. (0.5 mol) of 2-isopropoxy-phenol in ½ litre of N-aqueous potassium hydroxide solution is mixed while being vigorously stirred at 15° C. dropwise with 52 g. (0.56 mol) of epichlorohydrin. After stirring for 15 hours at 20° to 25° C. the clear solution is mixed with ½ litre of benzene and vigorously agitated. The aqueous phase is then discarded, the benzolic layer once more extracted with 100 ml. of water and then dried over anhydrous sodium sulphate. The benzene is distilled off under a water-jet vacuum and the residue fractionated in a high vacuum on a Hickmann Vigreux distillation column.

3 - (2'-isopropoxy-phenoxy)-1,2-epoxypropane passes over as a colourless liquid boiling at 71° to 76° C. under 0.05 mm. Hg.

*Example 2*

Tablets are prepared which contain 20 mg. of active substance and have the following composition: 1-isopropylamino-2-hydroxy-3-(2'-isopropoxy-phenoxy)-

|  | Mg. |
|---|---|
| Propane | 20 |
| Starch | 60 |
| Lactose | 50 |
| Colloidal silicic acid | 5 |
| Talcum | 9 |
| Magnesium stearate | 1 |
|  | 145 |

*Example 3*

In the manufacture of capsules the following mixture is used:

|  | G. |
|---|---|
| 1 - isopropylamino - 2 - hydroxy-3-(2'-isopropoxy-phenoxy)-propane | 2500 |
| Talcum | 80 |
| Colloidal silicic acid | 20 |

The active substance is intimately mixed with talcum and colloidal silicic acid, the mixture passed through a sieve (0.5 mm.) and 21 mg. portions of it filled into hard gelatine capsules.

*Example 4*

The new compounds can be used in the form of pharmaceutical preparations containing them in admixture or conjunction with vasodilative, especially coronary-dilative, compounds, primarily vasodilative esters of nitrous or nitric acid, above all nitro-glycerin, penta-erythritol tetranitrate, triethanolamine trinitrate, nitromannitol, and/or papaverine, theobromine, theophylline, hydroxy-ethyltheophylline, dihydroxy-propyltheophylline, and/or other coronary-dilative derivatives of theobromine or theophylline, and/or 2-ethyl-3-(3',5'-diiodo-4'-hydroxy-benzoyl) - benzofuran, 2,6-bis-(diethanolamino)-4,8-di-piperidino-pyrimido (5,4-d) pyrimidine and/or N-3'-phenyl-propyl-(2')-1,1, diphenylpropyl-(3)-amine and/or adenosine.

The tablets are formulated so that the daily dose amounts to 5–50 mg. of 1-isopropylamino-2-hydroxy-3-(2'-isopropoxy-phenoxy)-propane and 5–50 mg. of penta-erythritol tetranitrate, advantageously with three administrations per day.

What is claimed is:

1. 1 - isopropylamino - 2 - hydroxy-3-(2'-isopropoxy-phenoxy)-propane of the formula

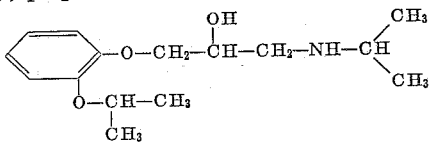

2. An acid addition salt of the compound claimed in claim 1.

References Cited

Lunsford et al.: "Journal American Chemical Society," vol. 82, pp. 1166–71 (1960).

CHARLES B. PARKER, *Primary Examiner.*

R. V. HINES, *Assistant Examiner.*